Figures 1, 2:
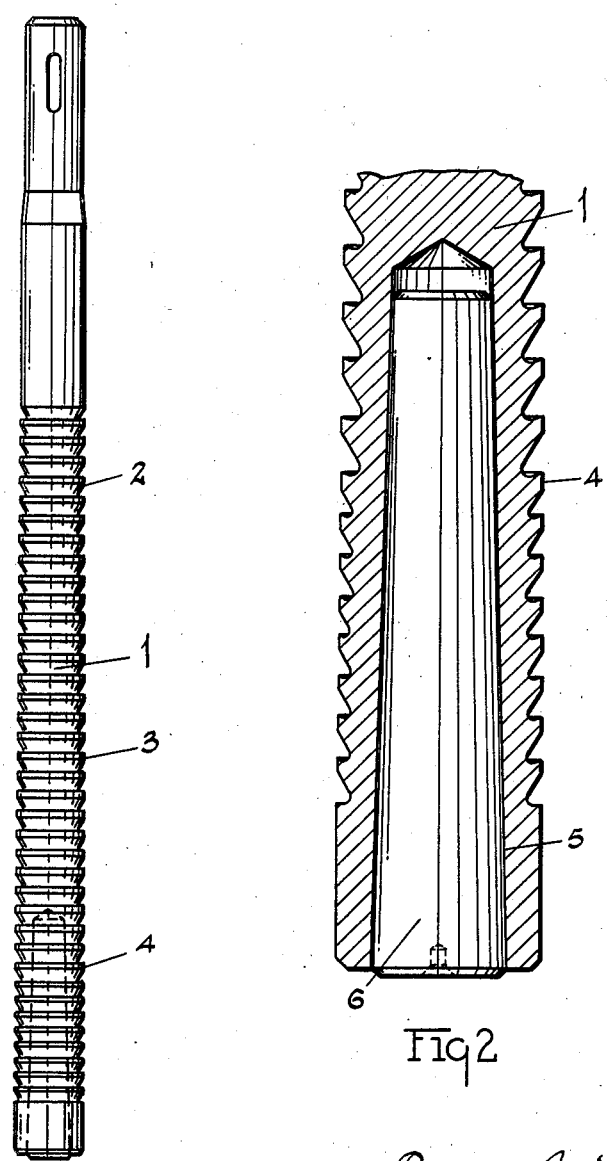

April 30, 1940.  E. J. LAPOINTE  2,199,343

METHOD OF RECLAIMING BROACH TOOLS

Filed May 12, 1939

Inventor
Elmer J. Lapointe
By Faust F. Crampton
Attorney

Patented Apr. 30, 1940

2,199,343

UNITED STATES PATENT OFFICE 2,199,343

METHOD OF RECLAIMING BROACH TOOLS

Elmer J. Lapointe, Ann Arbor, Mich., assignor to American Broach and Machine Company, Ann Arbor, Mich., a corporation of Michigan Application May 12, 1939, Serial No. 273,275

2 Claims. (Cl. 76—101)

My invention has for its object to provide a method for increasing the circumferential dimensions of tools that may be used for different purposes, where exact diametrical size is the controlling factor with reference to their utility. The invention is of particular value where extended use of such tools produces diminution of size and, eventually, the tool is rendered useless because of its inability to produce results within required limitations. This may be due to wear of the tool or it may be due to dullness of teeth produced by use and subsequent grinding, or otherwise sharpening, the teeth. Thus, it is often required that the last few hole-sizing teeth of broaches be formed within close limitations of definite sizes and, when slightly worn or dull and ground, but a slight degree, are considered worthless, and, ordinarily, new broaches must be purchased or formed in order to produce the required results in the work. The invention, thus, results in a great saving of tool cost.

A practical application of the invention is indicated in the drawing, wherein Fig. 1 illustrates a broach and Fig. 2 illustrates a section of the end part of the broach having the hole-sizing teeth. As is well known, broaches are formed of hardened steel of different kinds and are provided with teeth, having cutting edges of progressively increasing radial distances from their axes. The broach 1, illustrated in the drawing, is provided with circular teeth. The leading teeth 2 are shaped to produce rough cutting of the hole surface in the work and subsequent teeth, such as the teeth 3, produce progressive enlargements of the hole, and the teeth near the tail end of the broach, such as the teeth 4, produce the required size and surface finish of the hole in the work. Generally speaking, the teeth progressively increase in diameter from the leading end to the tail end and operate to correspondingly increase the diameter of the hole in the work. The rough-cutting teeth 2, and the progressive metal-removing teeth 3, may be frequently ground to sharpen them when dull, without materially affecting the life of the broach, but the finishing teeth 4 can be sharpened but little, and in many cases, scarcely touched with a grinding tool, where it is necessary to maintain the finish of the holes within the narrow limitations frequently specified in connection with the work.

By my invention, the tooth-sizing end of the broach, when worn to a point such that further sharpening cannot be performed without producing broach-cutting of the teeth having a diameter smaller than the limitations specified, is drilled axially to produce the opening 5, and the broach is heated from 400° to 600° Fahrenheit to expand the steel and a soft steel pin 6, at atmospheric or colder temperatures, is quickly inserted and pressed into place. It may be located in the opening 5 and merely tapped with a hammer to locate it in contact with the surface of the opening, preferably, substantially throughout the length of the opening. The diameter of the soft cool steel pin is made, as nearly as possible, to the size of the opening produced by the heat expansion of the metal. The diameter of the opening, formed in the end of the tool, is of a size approximating three-fourths of the exterior diameter of the tool to form a relatively thin wall and yet one that will withstand the stresses to which the tool is subjected when broach-finishing holes in work. This ratio of sizes, as between the interior diameter and the exterior diameter of the broach, may be varied according to the outside diameter of the tool.

If the tool is raised to the drawing temperature of about 1100° Fahrenheit, depending on the character of the steel, the heat expansion of a broach, having an outer diameter of 1½ inches, will produce expansion of the diameter of the opening of about .004 of an inch. When the soft metal is inserted and pressed into the opening by a quick movement, it reduces contraction of the wall of the broach upon cooling and, thus, maintains the end part of the broach larger than when first ground to the original size.

To increase the difference in temperature and quick chilling of the surface metal at the inner surface of the opening in the broach, the temperature may be reduced, such as to 0° Fahrenheit, to further reduce contraction of the body of the wall formed by the opening in the end of the broach. The temperature of the pin may be reduced by any suitable means, such as by the application of dry ice.

Since the pin operates to reduce contraction of the wall formed by drilling the end of the broach, the outside diameter of the hole-sizing teeth of the cold broach is substantially .002 or .003 larger than the original diameter before heating, and the teeth of the hole-sizing and finishing end of the broach may be sharpened and the life of the broach doubled.

When the sizing end of the broach has been, subsequently, repeatedly dulled and reground to a size less than the required limit, the pin may be drilled out and the broach heated, if desired, to a drawing temperature and a new pin, having a diameter as closely as possible to the diameter of the inner surface of the heat-expanded broach, may be quickly inserted and pressed into position to again hold the finishing end of the broach to an increased size and again the sizing teeth may be sharpened, by grinding, to the original required size.

If desired, the hole and the pin may be formed tapered to enable quick insertion and minimum heat-transference from the broach to the pin during insertion and produce maintenance of the maximum possible size when cool.

I claim:

1. A method of reclaiming a broach tool having an axially extending opening therein, which consists in heating and heat-expanding the finishing end of the broach and depositing a relatively cold soft steel pin, having an external surface approximately that of the surface of the said axially extending opening of the heat-expanded broach, into the opening to reduce contraction of the said end of the broach, said pin being thereafter removable to enable subsequent and further reclamations of said broach.

2. A method of reclaiming the hole-finishing teeth of the broach, having an axially extending tapered opening therein, which consists in heating and heat-expanding the finishing end of the broach and quickly depositing a relatively cold soft steel tapered pin, having an external surface approximately that of the inner surface of the heat-expanded broach, into the opening to reduce contraction of the said end of the broach, said pin being thereafter removable from said opening to enable repetitive reclamations of said hole-finishing teeth.

ELMER J. LAPOINTE.